Sept. 3, 1935.   H. C. BUTLER   2,013,599
AUTOMOBILE EQUALIZER SPRING SUSPENSION
Filed June 12, 1934    2 Sheets-Sheet 1

Howard C. Butler
INVENTOR

BY Victor J. Evans & Co.
ATTORNEY

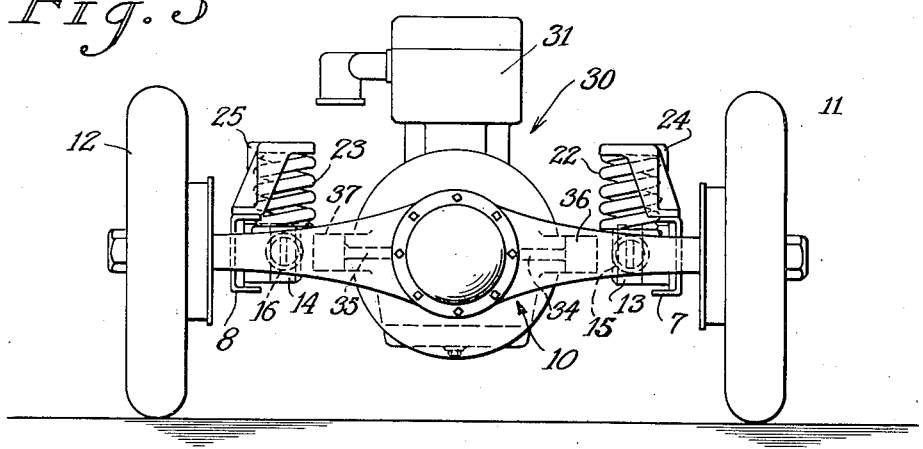
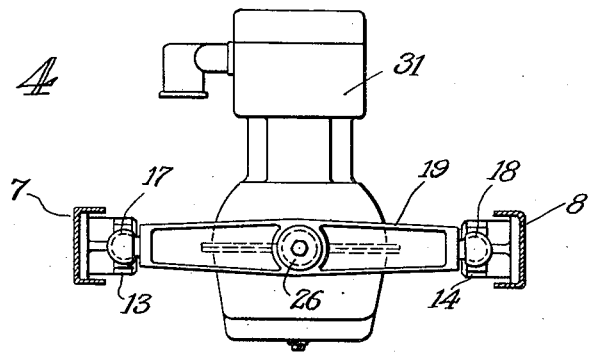
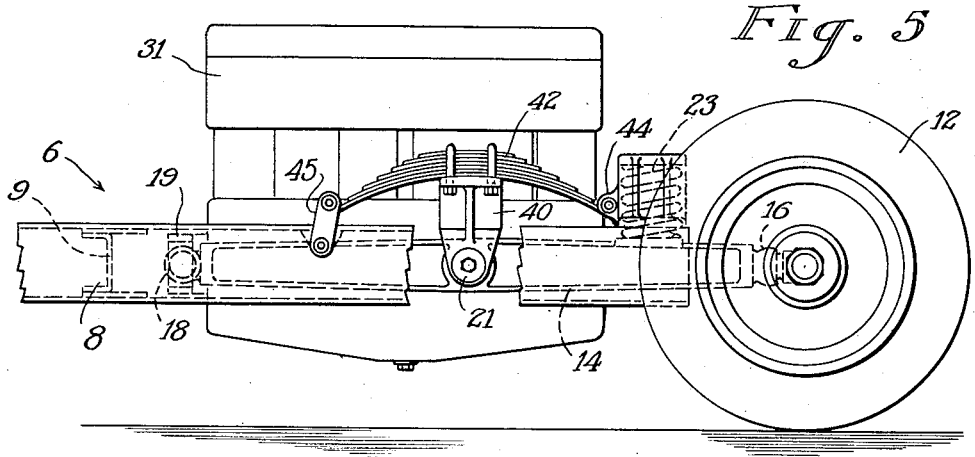

Patented Sept. 3, 1935

2,013,599

UNITED STATES PATENT OFFICE 2,013,599

AUTOMOBILE EQUALIZER SPRING SUSPENSION

Howard C. Butler, Ossining, N. Y.

Application June 12, 1934, Serial No. 730,314

5 Claims. (Cl. 180—57)

This invention relates generally to improvements in motor vehicles and more particularly to the spring suspension of the vehicle wherein the power plant unit is disposed in close proximity to the drive axle.

It is the primary object of my invention to provide an improved spring suspension system in which is incorporated a practical support for the power generating and transmission units and by which the engine may be mounted adjacent the drive axle without however being subjected to the severe road shocks normally encountered in such an arrangement.

Another object of my invention is to provide a novel construction for the suspension of the drive axle and for the support of the power plant unit in which the static inertia of this unit effects a snubbing action to dissipate the road shocks imparted to the drive axle and which spring suspension system may be adapted for front or rear axle support wherein would be minimized the cause of chassis weaving action.

A further object of my invention is to provide a cushioning means between the wheel axles and the chassis of the vehicle wherein the individual wheel action would be facilitated without however abandoning the advantages of rigid axle construction.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therein as do not affect the spirit of the invention nor exceed the scope thereof as expressed in the appended claims.

In describing the invention in detail and the particular physical embodiment illustrating the invention, reference is had to the accompanying drawings wherein like characters of reference designate corresponding parts thruout the several views.

In the drawings:

Fig. 3 is an end elevational view.

Fig. 4 is a lateral sectional view taken on line 4—4 of Fig. 1; and

Fig. 5 is a side elevational view with parts broken away and illustrating a modified form of my invention.

Figure 1:
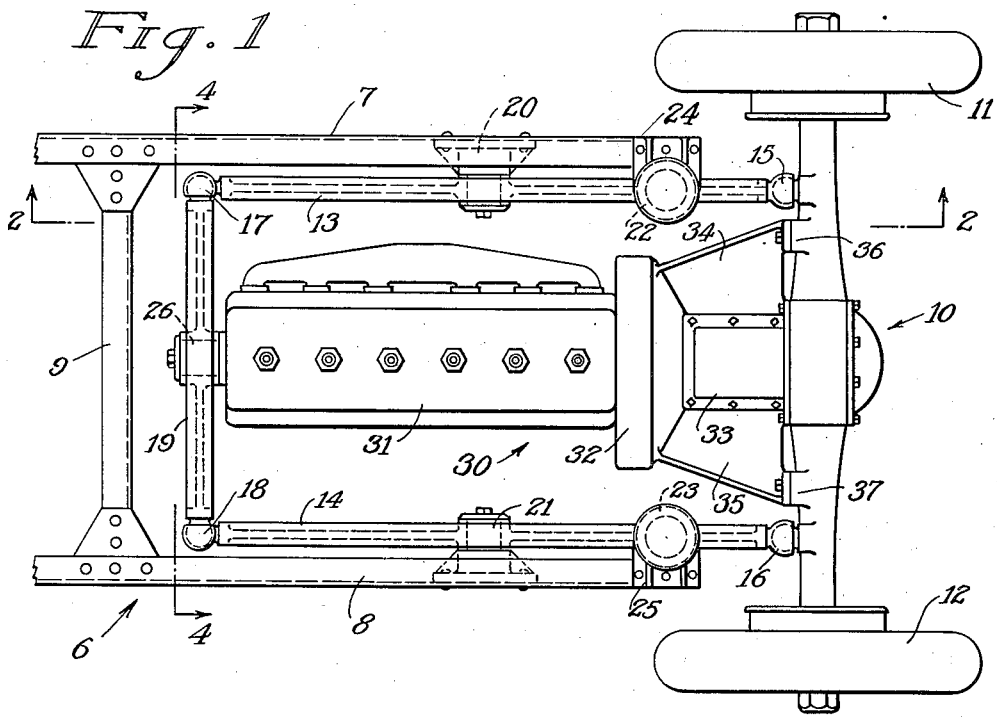
Fig. 1 is a plan view of the drive end of a vehicle chassis.
Figure 2:
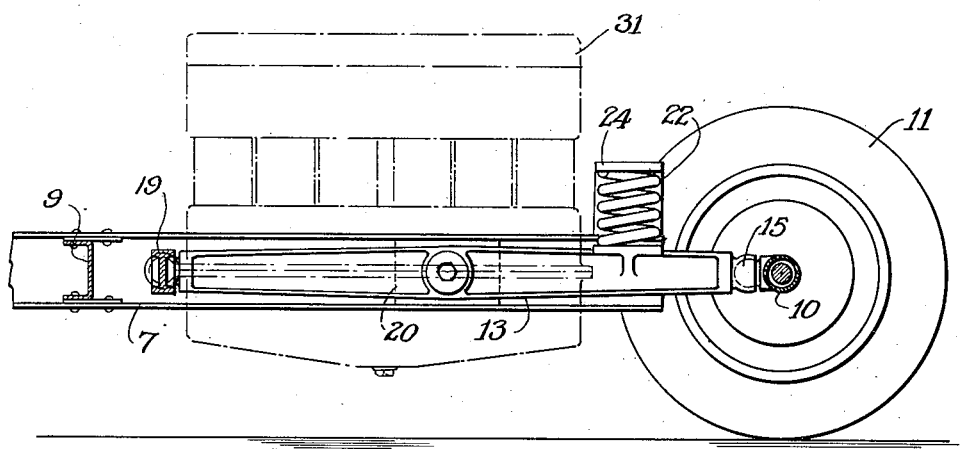
Fig. 2 is a vertical sectional view on line 2—2 of Fig. 1 and showing in outline the engine of the vehicle.

Referring to the drawings for a more detailed description thereof, numeral 6 indicates generally a portion of the chassis of the vehicle comprising side members 7 and 8 and cross member 9 secured to same, these members and others, not shown, forming a rigid structure. The drive axle 10 supports and provides rotation for the vehicle wheels 11 and 12. The spring suspension of the drive axle 10 comprises in generally suspension levers 13 and 14 connected at respective ends to the drive axle 10 by ball joints 15 and 16 and having their opposite ends connected by ball joints 17 and 18 to the ends of a lateral equalizing lever 19. Suspension levers 13 and 14 are respectively pivoted on brackets 20 and 21, which brackets are secured to the respective side members 7 and 8 of the vehicle chassis. Intermediate the pivots 20 and 21 and the ball joints 15 and 16, the respective suspension levers 13 and 14 are resiliently supported by springs 22 and 23, which springs are retained in vertical position by their brackets 24 and 25, which brackets are rigidly affixed to the respective ends of the chassis side members 7 and 8. The equalizing lever 19 is pivoted intermediate its ends on stud 26 which stud is integral with the casing of the engine and disposed in axial alignment with the center of gravity of the power plant unit.

The power plant unit is indicated by numeral 30 and comprises the engine 31, clutch unit 32 and the change speed transmission 33, the housings of the units forming a rigid unitary structure supported at one end by the stud 26. The transmission housing is directly connected to the differential housing of the drive axle. Integral with the housings 32 and 33 are the divergent brackets 34 and 35 which terminate in spaced lugs secured to pads 36 and 37 formed on the drive axle. It is to be noted here that this arrangement provides a three-point support for the power plant unit 30, which support has been found to be the most desirable in this type of mechanism. Pivot brackets 20 and 21 are positioned in axial alignment with each other and upon a vertical plane passing thru the center of gravity of power plant unit 30 so that unit 30 independent of springs 22 and 23 would normally remain in static balance on its support. Springs 22 and 23 are illustrated as of the helical or coil spring type in that this type of spring has been found to provide greater resilience in a limited travel than do other types of springs.

In the travel of the vehicle of my invention let us presume that a single projection has been encountered by one of the wheels forcing that wheel upwardly. This action will raise the axle end of the suspension lever and correspondingly compress the suspension spring of that lever wherein the upward force of the wheel is partially expended. The opposite end of the suspension lever swings downwardly, this downward movement being transmitted to the respective end of equalizing lever 19 which, because of its pivotal connection to power plant unit 30 and because of the static inertia of said unit, causes the opposite wheel, thru the cooperation of its respective suspension lever, to tend to force the opposite wheel into firmer contact with the road. Assuming, for example, that the wheel 11 encounters the road shock thus causing its suspension lever 13 to swing on its pivot 20. The raising of the wheel 11 will also cause spring 22 to compress, by which compression the side 7 of the chassis 6 is slightly raised. The swinging of suspension lever 13 will transmit, thru equalizing lever 19 and the other suspension lever 14, a motion to the opposite wheel 12 tending to force same into firmer contact with the road. Since the tire of wheel 12 resists this tendency the force applied to lever 14 will thus effect a rising of the side 8 of the chassis 6 to correspond substantially with the raising of the side 7. It will thus be noted that the chassis 6 is maintained on an even level altho only one of the wheels is enclosed by an appreciable road shock. In this fashion smoother riding action of the chassis will be attained thus to eliminate the weaving action of the chassis normally resulting from such road conditions.

Let us suppose now that the vehicle encounters a lateral projection in the road which causes both wheels to rise simultaneously, such as the travel over a curb stone. The rise of both wheels is expended in their respective springs thru the coaction of their suspension levers, the opposite ends of which swing downwardly. In this action the equalizing lever 19 remains relatively stationary. The snubbing action effected by the power plant unit, one of the obects of the suspension system of my invention, is operative as follows. Because of the arrangement of the center of gravity of power plant unit 30 in alignment with pivots 20 and 21, the static inertia of unit 30 will offer a resistance of travel in the swinging of suspension levers 13 and 14 on their pivots, which resistance results in the aforesaid snubbing action.

In Fig. 5 I have illustrated a modified form of my suspension system in which pivots 20 and 21 are resiliently connected to the side members of the chassis by brackets 40 and semi-elliptical leaf springs 42 the pivot 21 on the far side of the chassis 6 being connected to the chassis similarly as is the pivot 21. Spring 42 is secured at one end to chassis side member 8 by the yoke 44 and at the opposite end by pivoted shackle 45. The portion of spring 42 between yoke 44 and bracket 40 acts as a swinging arm to maintain the proper position of pivots 20 and 21 in relation to the chassis side members, shackle 45 being provided to take care of the longitudinal expansion of the spring.

In this modified form the action of the suspension system in travel over roads is identical to that described for the first form except that in this modified form a greater resilience is obtained. Springs 22 and 23, being stronger than the respective springs 42, will be effective as a fulcrum in the movements of the suspension levers 13 and 14. Thus, as the wheel 12 rises, lever 14, being fulcrumed on spring 23, results in a downward movement of pivot 21 and a compression of spring 42, thus providing greater resilience. Should road conditions be encountered wherein the compression of springs 22 and 23 should vary, this variation would cause equalizing lever 19 to function in its capacity to stabilize the travel of the vehicle's chassis and thus eliminate the objectionable weaving action as described in the first form.

Although in the physical embodiment of my invention illustrated in the drawings I have shown my suspension system in cooperation with the drive axle of the vehicle, it will be apparent that this system may be adapted to the suspension of the steering axle of the vehicle. This arrangement would of course necessitate the substitution of a rigid frame connected at one end to the steering axle, the opposite end being pivoted on a like equalizing lever. If desired, this frame may be weighted to react in operation as does the weight of the power plant unit.

What is claimed is:

1. A chassis comprising a main frame, an auxiliary frame resiliently and pivotally mounted on said main frame and including side members and a transverse member flexibly connected to said side members, a drive axle flexibly connected to said side members and means for supporting an engine, said means being rigidly connected to said axle and swivelly connected to said transverse member.

2. A chassis comprising a main frame, an auxiliary frame resiliently and pivotally mounted on said main frame and including side members and a transverse member flexibly connected to said side members, a drive axle flexibly connected to said side members and means for supporting an engine, said means being rigidly connected to said axle and swivelly connected to said transverse member, an engine on said support, the center of gravity of said engine being in alignment with the pivotal connection between the main and auxiliary frames.

3. A chassis comprising a main frame, an auxiliary frame pivotally mounted on said main frame and including side members and a transverse member flexibly connected to said side members, a drive axle flexibly connected to said side members and supporting means rigidly connected to said axle and swivelly connected to said transverse member.

4. A chassis comprising a main frame, an auxiliary frame including side members and a transverse member flexibly connected to corresponding ends of said side members, resiliently mounted pivotal connections joining said auxiliary frame to said main frame, a drive axle to which said auxiliary frame is flexibly connected and supporting means rigidly connected to said drive axle and swivelly connected to said transverse member.

5. A chassis comprising a main frame including side beams, and an auxiliary frame including side members which are pivotally mounted on said side beams, said auxiliary frame including an axle and a transverse member, said transverse member being flexibly connected to said side members, and an engine rigidly connected to said axle and pivotally connected to said transverse member.

HOWARD C. BUTLER.